United States Patent [19]

Riso et al.

[11] Patent Number: 4,648,102
[45] Date of Patent: Mar. 3, 1987

[54] BUS INTERFACE DEVICE FOR A DATA PROCESSING SYSTEM

[75] Inventors: Vladimir Riso, Nice; Roland Kuhne, La Colle Sur Loup, both of France

[73] Assignee: International Business Machines Corp., Armonk, N.Y.

[21] Appl. No.: 586,475

[22] Filed: Mar. 5, 1984

[30] Foreign Application Priority Data

Mar. 29, 1983 [EP] European Pat. Off. ........... 83430013

[51] Int. Cl.$^4$ ...................... H04L 7/00; G06F 13/00
[52] U.S. Cl. .................................. 375/106; 364/900; 307/480; 307/247.1
[58] Field of Search ... 364/200 MS File, 900 MS File; 340/825.70, 825.65; 370/85, 100; 375/106, 110, 4; 307/471, 480, 247.1; 328/154

[56] References Cited

U.S. PATENT DOCUMENTS

| | | | |
|---|---|---|---|
| 4,442,502 | 4/1984 | Friend et al. | 364/900 |
| 4,481,640 | 11/1984 | Chow et al. | 375/84 X |
| 4,491,909 | 1/1985 | Shimizn | 364/200 |
| 4,539,533 | 9/1985 | French | 375/47 |
| 4,547,738 | 10/1985 | Bayer et al. | 375/82 |

FOREIGN PATENT DOCUMENTS

| | | |
|---|---|---|
| 53-72541 | 6/1978 | Japan .......... 340/825.12 |
| 56-149630 | 11/1981 | Japan . |
| 56-168256 | 12/1981 | Japan . |

OTHER PUBLICATIONS

Electro 76 Professional Program No. 1976, 1976, pp. 1-6, Session 20-3, New York, T. McMullen et al.: "Using Digital Techniques for Improved Weak Signal Reception".

Michael Rogers: "Locate Interrupts for μp Peripherals Quickly Without the Need for Polling"; Electronic Design, vol. 25, No. 5, 7/1977, pp. 104-106.

*Primary Examiner*—James D. Thomas
*Assistant Examiner*—Thomas L. Lee
*Attorney, Agent, or Firm*—John B. Frisone

[57] ABSTRACT

A bus interface device for a data processing system in which 2M units are interconnected and exchange information bits over a bus comprising at least M lines.

The device comprises a receiving circuit associated with each respective line (D0-D7) of the bus and including two flip-flops 40 and 41 that assume the voltage level on the input line at the up-going and down-going transitions of a clock signal (CLK1) and are restored at the down-going and up-going transitions of that signal. When the bits received over the bus are encoded in the NRZ code, using a bit period equal to half a period of the clock signal, OR circuit 47 provides at its output the resynchronized train of input bits received over D0-D7.

The 2M units are divided into two groups, with the units in each group requesting access to the bus during either phase of a second clock signal (CLK2). When the bus is free, flip-flops 48 and 49 provide an indication of the requests for access to the bus made by the associated units.

3 Claims, 5 Drawing Figures

BUS INTERFACE DEVICE FOR A DATA PROCESSING SYSTEM

TECHNICAL FIELD

This invention relates to a bus interface device for a data processing system wherein 2M data processing units are connected to a central control unit via a bus comprising M lines over which bits can be exchanged between the processing units and the central control unit, and, more particularly, to an interface device capable of receiving and resynchronizing the incoming bits and also of identifying the units requesting access to the bus.

BACKGROUND ART

Generally, in a data processing system, data processing units are connected to a central control unit via a bus over which bytes can be transmitted from the central control unit to the processing units and vice versa. These bytes comprise a number M of bits, so that the bus must comprise M lines to transfer the M bits from the processing units to the central control unit.

In some systems, the bits sent over each line are represented by a voltage level that is either high or low during a time interval t, in accordance with the NRZ coding method. However, the NRZ method, while simple, requires that resynchronization means be provided to permit retrieving the bits at the receiving end.

In such a context, provision must be made in the central control unit for an interface device that is capable of resynchronizing the bits received from the data processing units and of identifying the units requesting access to the bus.

In addition, each unit must include a bus interface device for resynchronizing the bits received from the central control unit.

Whenever a unit desires to access the bus, it sends a Request Bus bit over a line specifically allocated thereto in the bus. For example, unit 0 will send the bit over line 0, unit 1 will use line 1, etc. Consequently, the larger the number of connected units, the larger the number of lines required will be; alternatively, a more complicated exchange protocol should be used, for example one that would involve encoding the requests placed on several lines (and employing a suitable algorithm to prevent contentions).

The disadvantage of using a bus comprising a large number of lines is that it will increase the cost of the system. Also, since most of today's circuits are miniaturized, the space taken by bulky interconnection cables and input/output connectors will obviously create packaging problems. In addition, when a great many lines are used, it is difficult to avoid variations in line characteristics (such as impedance and signal propagation time).

To develop a more complicated exchange protocol would require the use of decoding and decision-making circuits to determine which unit is to gain access to the bus, a time-consuming process.

DISCLOSURE OF THE INVENTION

It is, therefore, an object of this invention to provide a bus interface device that is both simple and capable of resynchronizing the incoming bits and identifying in one cycle which of 2M units are requesting access to the bus, even though the bus may comprise no more than M lines for transferring information bits.

It is another object of the invention to provide such an interface device that allows information bits to be exchanged at high speed.

This invention relates to a bus interface device for a data processing system wherein 2M data processing units are connected to a central control unit via a bus comprising at least M lines over which information bits can be exchanged between the central control unit and the processing units.

In such an arrangement, the bus interface device provided in each processing unit for receiving bytes from the central control unit, or in the latter unit for receiving bytes from the processing units, comprises at least M receiving circuits, each of which is associated with a respective line of the bus to resynchronize and reshape the bits sent over that line, with the bits being represented by a voltage level that is either high or low during each bit period t.

Each receiving circuit comprises first and second flip-flops. The first fip-flop has a data input to which the train of bits from the bus is applied, and provides an output that assumes the level of the input train of bits at the up-going transition of a first clock signal the period of which is twice the bit period, said flip-flop being restored at the down-going transition of said first clock signal. The second flip-flop has a data input to which the train of bits from the bus is applied, and provides an output which assumes the level of the input train of bits at the down-going transition of the first clock signal, said flip-flop being restored at the up-going transition of said clock signal.

The outputs from the two flip-flops are ORed in an OR circuit which supplies a train of resynchronized bits to be used by the circuits of the data processing units or by those of the central control unit.

In such an arrangement, the units are divided into a first and a second groups of M units, each of the M units in the first group transmitting its Request Bus bits, when the bus is free, over one of the M lines during a first phase of a second clock signal having the same period as the first clock signal and differing therefrom by $\pi/2$, and each of the M units in the second group transmitting its Request Bus bits, when the bus is free, over one of the M lines during the second phase of said second clock signal. In each receiving circuit associated, in the bus interface unit provided in the central control unit, with one of the M lines of the bus, a third flip-flop has an input connected to the output of the first flip-flop to store the state thereof when the bus is free and supply the Request Bus bit from the corresponding unit in said first group, and a fourth flip-flop has an input connected to the output of the second flip-flop to store the state thereof when the bus is free and to supply the Request Bus bit from the corresponding unit in the second group.

BRIEF DESCRIPTION OF THE DRAWINGS

The foregoing and other objects, features and advantages of the invention will be apparent from the following more particular description of a preferred embodiment of the invention, as illustrated in the accompanying drawings.

DETAILED DESCRIPTION OF THE INVENTION

Figures 1, 1A:
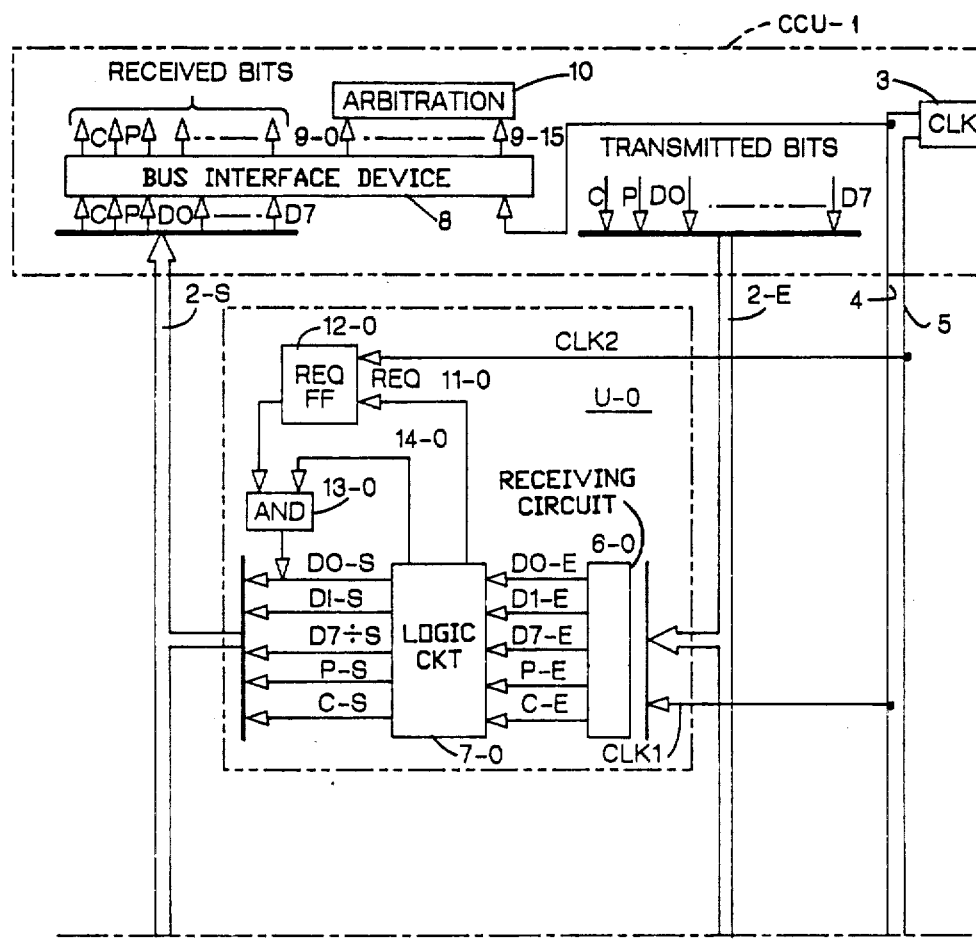
FIG. 1 is a diagram of a data processing system in which the bus interface devices of the present invention can be used.
Figure 1B:
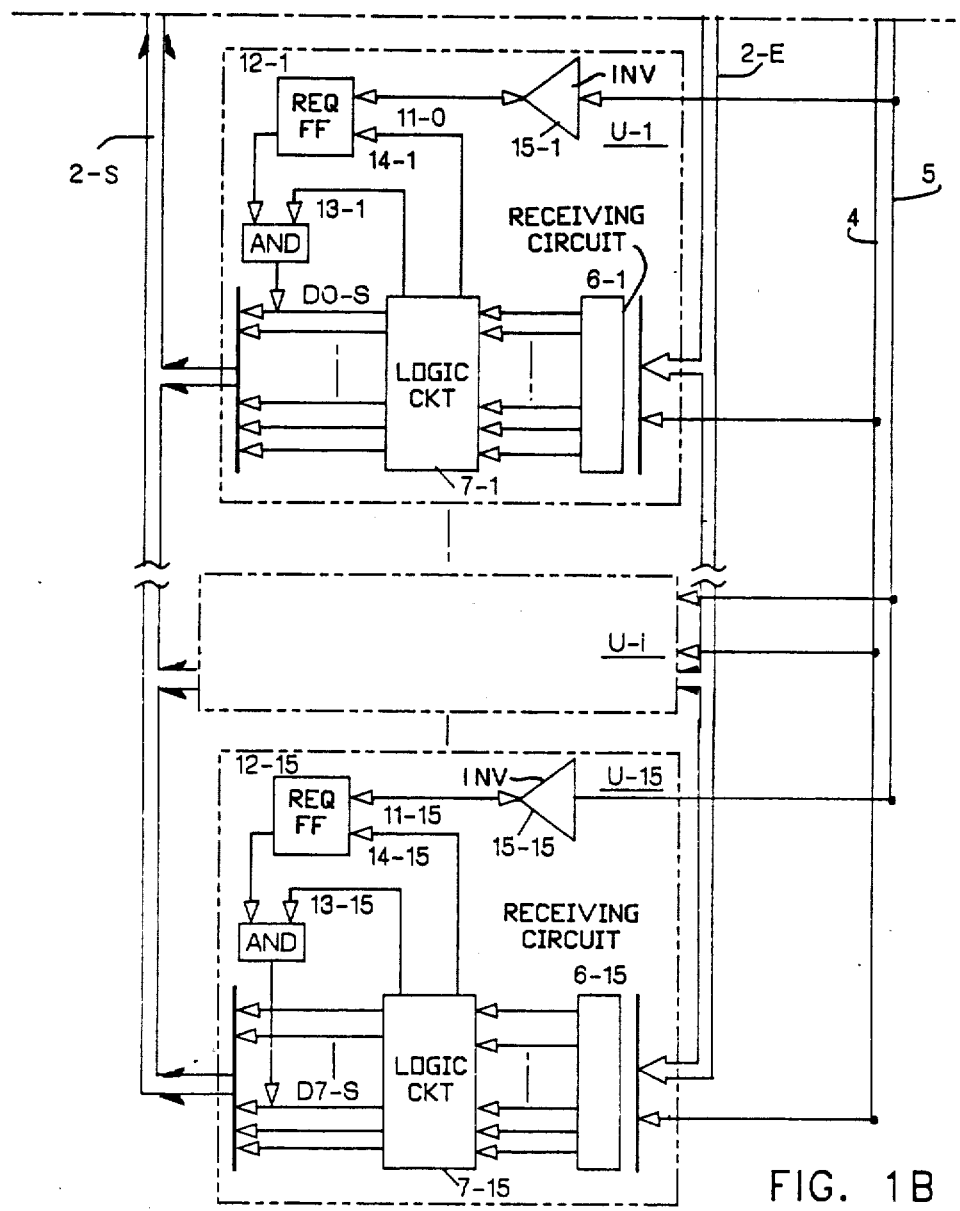

As shown in FIG. 1, the bus interface device of the present invention can be used in an arrangement wherein 2M units U-i (with $0 \leq i \geq 2M-1$) are connected to a central control unit (CCU) 1, which may be a central procesing unit or a communications controller, via a shared bus 2.

In the embodiment described hereafter, 2M shall be assumed to be equal to 16, but it should be understood that the present invention can be used in larger or smaller systems.

Central control unit CCU sends information bits to the various units U-i over the lines of the input portion of the bus, 2E, and receives information bits from units U-i over the lines of the output portion of the bus, 2S.

In bus 2, M or 8 lines, labeled D0-D7, carry data or control bits making up a byte, one line carries the parity bit P of the byte, and one line carries a control bit C the setting of which indicates whether the bits on lines D0-D7 are data bits or control bits.

Figure 5:
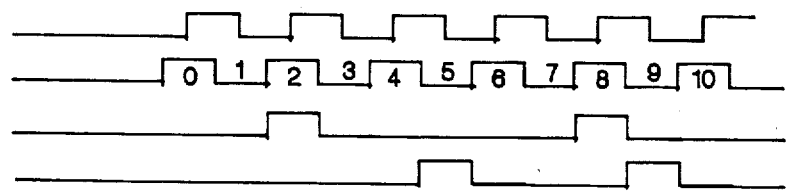
FIG. 5 is a timing diagram illustrating the waveforms required in the circuit of FIG. 4 to identify the units requesting access to the bus.

A clock 3 in control unit CCU 1 provides on lines 4 and 5 two trains of clock pulses CLK1 and CLK2 the period of which is twice a bit period. The two trains of pulses differ in phase by $\pi/2$ and are shown in FIG. 5.

The components of units U-0 to U-15 shall be designated hereafter by a numeral followed by a suffix corresponding to that of the unit concerned.

Each unit U-i includes receiving circuits 6-i that make up a bus interface device in accordance with the invention. These circuits reshape and resynchronize the bits received over the lines of bus 2E, as will be described with reference to FIG. 2.

The input bits D0-E to D7-E, P-E and C-E, as supplied by circuits 6-i are then used by logic processing circuits 7-i in unit U-i in accordance with the application involved.

The output bits D0-S to D7-S, P-S and C-S that are generated by processing circuits 7-i of unit U-i are then sent to central control unit CCU 1 over bus 2-S and received by a bus interface device 8, which operates on the same principle as circuits 6-i.

Also, interface device 8 serves to determine which of the U-i units have requested access to the bus. Accordingly, interface device 8 includes circuits identical to circuits 6-i for receiving the C and P bits, and circuits connected to lines D0-D7 of bus 2-S for resynchronizing the bits received thereon from units U-i, for providing received bits D0-D7, and for generating on 16 outputs, 9-0 to 9-15, a signal indicating that a corresponding unit U-0 to U-15 has requested access to the bus.

Outputs 9-0 to 9-15 are connected to an arbitration circuit 10, which will select the requesting unit that is to gain access to the bus, as is conventionally done in all arrangements wherein common resources are shared.

Interface device 8 in accordance with the invention permits a reduction in the number of lines in the bus. In a conventional system, a unit U-i that desires to access the bus would activate one of sixteen lines thereof. In the preferred embodiment 16 units use the eight line bus 2-S to accomplish the same result.

In accordance with the invention, the units are formed into two groups such as group 0, comprised of even-numbered units 0-4, and group 1, comprised of odd-numbered units 1-15.

Whenever a unit U-i desires to access the bus, it generates a Request Bus bit on line 11-i. This signal is applied to the D input of a D-type flip-flop 12-i.

The clock input C of flip-flops 12-i in the group 0 units receives the clock signal CLK2, and the C input of flip-flops 12-i in the group 1 units receives the inverse thereof, $\overline{CLK2}$, supplied by inverters 15-i.

When the system is free, that is, when no bit transfers are taking place on the lines of bus 2-S, the outputs from the request latches are applied to said lines through AND gates 13-i enabled by a Bus free signal generated on lines 14-i. In the preferred embodiment, the Request Bus signals from the first units, U-0 and U-1, in the respective groups are respectively applied through AND gates 13-0 and 13-1 onto line D0-S, the Request Bus signals from the second units, U-2 and U-3, in the respective groups, are respectively applied through AND gates 13-2 and 13-3 onto line D1-S, and so forth, and the Request Bus signal from the last units, U-14 and U-15, are applied onto line D7-S.

The clock signals CLK1 and CLK2 differ in phase by $\pi/2$ and the requests from group 0 units are placed onto lines D0-D7 during one of the phases of CLK2, for example when CLK2 is high in the preferred embodiment, and requests from group 1 units will be placed onto the same lines during the other phase of CLK2, that is, when CLK2 is low in the preferred embodiment.

Figure 2:
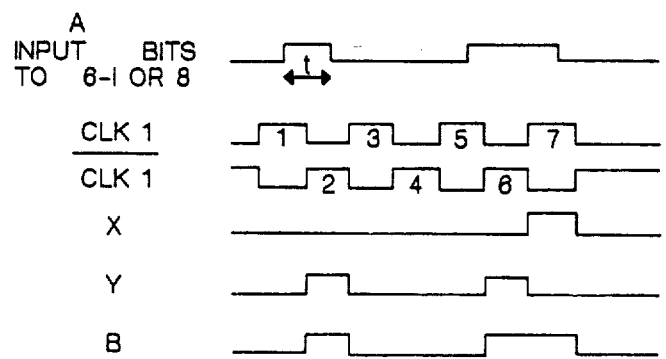
FIG. 2 is a timing diagram of the trains of bits received by the interface devices and shows the waveforms obtained in said devices.

Referring now to FIG. 2, the data or control bits supplied to interface devices 6-i and 8 to be resynchronized are shown at A. These bits are at a high or low level within each bit period, t, to represent a binary 1 or 0. The figure also shows the clock signals CLK1 and $\overline{CLK1}$ used for resynchronizing bits in the interface devices, and the signals X and Y generated therein. The bits obtained at the output of the circuits comprising the interface device are shown at B.

Figure 3:
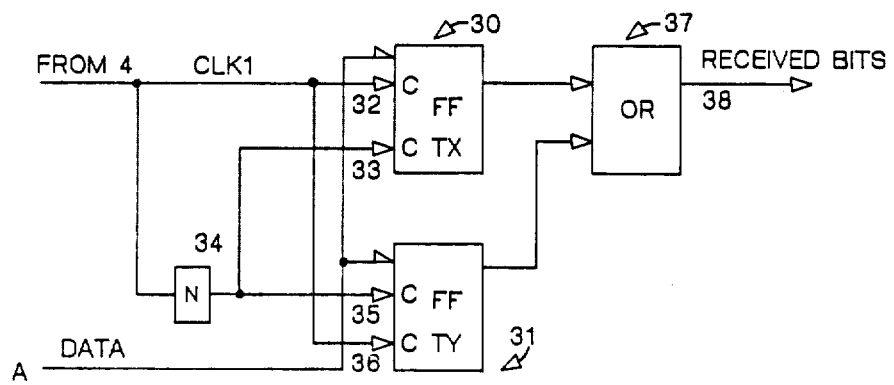
FIG. 3 shows a receiving circuit comprising the interface devices.

Referring now to FIG. 3, there is shown one of the receiving circuits of an interface device 6-i associated with one of the lines of bus 2-E for resynchronizing the A input bits received from this line, it being understood that one such circuit per line is provided in device 6-i. Two identical circuits are used to receive the control and parity bits, C and P, in interface device 8.

Each receiving circuit comprises two flip-flops, TX30 and TY31, the data inputs of which receive a train of A bits. Flip-flop 30 has two clock (C) inputs 32 and 33 which are respectively supplied with clock signal CLK1 and the inverse thereof, $\overline{CLK1}$, provided by inverter 34.

Similarly, flip-flop 31 has two clock inputs 35 and 36 which receive signal CLK1 from inverter 34 and signal CLK1, respectively.

The two flip-flops assume the state of input signal A at the up-going transition of the clock signal applied to their inputs 32 and 35, and are restored at the up-going transition of the clock signal applied to their inputs 33 and 36, with their outputs being at a low logical level in a preferred embodiment.

As shown at A in FIG. 2, the input bits to each receiving circuit are encoded in the NRZ code. That is, a 1 or a 0 bit will be represented by a high or a low voltage level during a time interval equal to half a period of clock signal CLK1.

Accordingly, TX30 will assume the state (high or low level) of the input bits at the up-going transition of clock signal CLK1 and will be restored at the down-going transition of CLK1. The output from flip-flop TX30 is shown at X in FIG. 2.

Flip-flop TY31 will assume the state (high or low level) of the input bits at the up-going transition of clock signal CLK1 and will be restored at the down-going transition thereof. The output from flip-flop TY31 is shown at Y in FIG. 2

In the illustrated example, X is at a high level during half-period 7 and Y is at a high level during half periods 2 and 6.

The X and Y outputs from flip-flops 30 and 31 are applied as inputs to an OR circuit 37, which provides the B waveform on its Received Bits output line 38.

Figure 4:
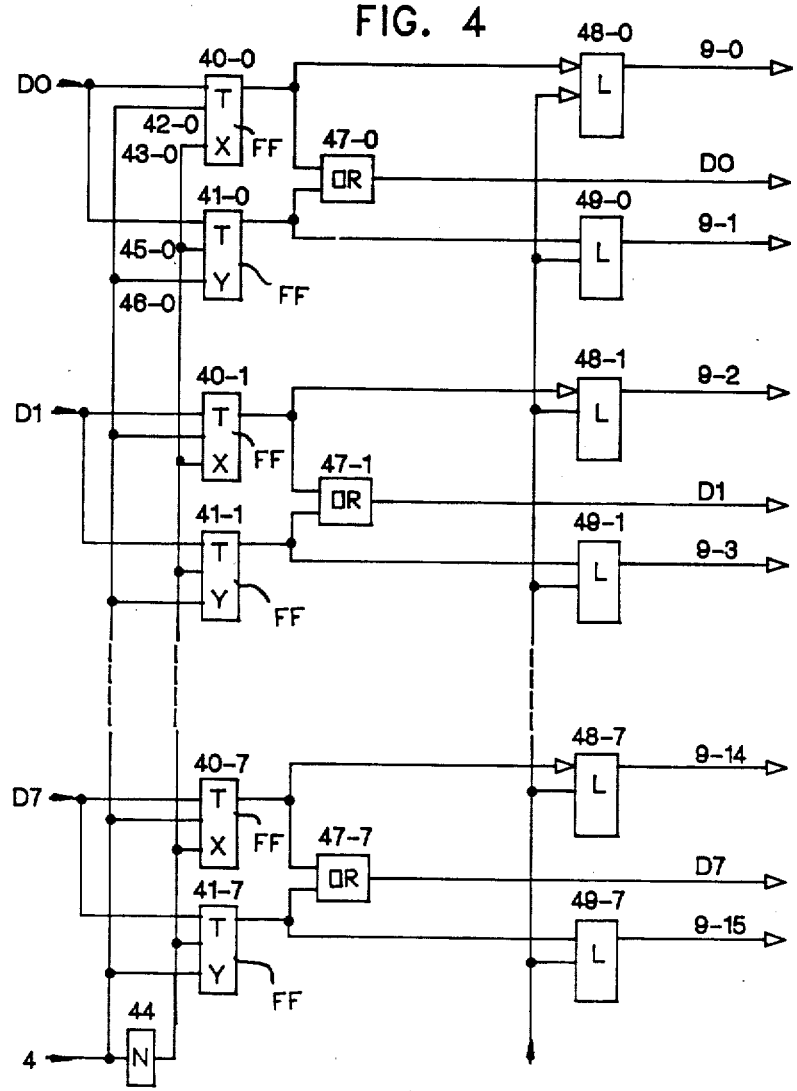
FIG. 4 shows an array of M receiving circuits comprising interface device 8 as connected to the M lines of the bus that carry the information bits.

Referring now to FIG. 4, the circuits of interface device 8 that are used to retrieve the bits sent over lines D0–D7 of bus 2-S and to identify the units requesting access to the bus will be described.

Two flip-flops TX and TY (40-0 and 41-1 to 40-7 and 41-7) as well as an OR circuit (47-0 to 47-7) are associated with each of the lines D0–D7 of bus 2-S and are arranged and used in the same manner as flip-flops 30, 31 and OR circuit 37 of FIG. 3. Inputs 42 and 46 of the flip-flops (corresponding to inputs 32 and 36 of the flip-flops in FIG. 3) receive clock signal CLK1 while inputs 43 and 45 (corresponding to inputs 33 and 35 of FIG. 3) receive the inverse thereof as supplied by inverter 44. In the manner previously described with reference to FIG. 3, OR circuits 47-0 to 47-7 supply bits D0–D7 as received by central control unit CCU 1 for processing.

Also, each input line D0–D7 receives from the various units the bits representing their requests for access to the bus, as described with reference to FIG. 1.

The group 0 units can place their Request Bus bits onto lines D0–D7 during phases 0, 2, 4, 6, 8 and 10 when signal CLK2 is high, and the group 1 units can place their Request Bus bits on the same lines during phases 1, 3, 5, 7 and 9 when signal CLK2 is low, as shown in FIG. 5.

Accordingly, assuming that a request is placed onto one or more of lines D0–D7 of bus 2-S during phases 2 and 8, those of flip-flops 40-0 to 40-7 which are receiving a high input signal will change state at the up-going transition of CLK1 and produce a high output signal.

The outputs of flip-flops 40-0 to 40-7 are connected to the inputs of flip-flops 48-0 to 48-7, which store the state of the output signals from flip-flop 40-0 to 40-7 when the bus is free and, therefore, when the requests for access to the bus can be processed by arbitration circuit 10.

The output lines of flip-flops 48-0 to 48-7 constitute lines 9-0, 9-2 to 9-14 of FIG. 1 and a high signal on these lines indicates that the corresponding group 0 units have requested access to the bus.

Assuming that a request is placed onto one or more of lines D0–D7 during phases 5 and 9, when signal CLK2 is low as shown in FIG. 5, those of flip-flops 41-0 to 41-7 which are receiving a high input signal will change state at the up-going transition of CLK1 and will, therefore, produce a high output signal.

The outputs of flip-flops 41-0 to 41-7 are connected to the inputs of flip-flops 49-0 to 49-7, which store the state of the output signals from flip-flops 41-0 to 41-7 when the bus is free.

The output lines of flip-flops 49-0 to 49-7 constitute lines 9-1, 9-3 to 9-15 and a high signal on these lines indicates that the corresponding group 1 units have requested access to the bus.

While there has been described what are at present considered to be a preferred embodiment of this invention, it will be obvious to those skilled in the art that various changes and modifications may be therein without departing from the invention, and it is, therefore intended to cover all such changes and modifications as fall within the true spirit and scope of the invention.

What is claimed is:

1. In a data processing system in which up to 2M data processing units are connected to a central control unit by a bus having M lines enabling bytes of M information bits to be exchanged between the data processing units and the central control unit, M is a positive integer, each of said data processing units and said central control unit include a bus interface mechanism, said bus interface mechanism comprising: M receiving circuits connected to different ones of the M bus lines respectively for resynchronizing and reshaping the train of bits received over each line, said bits being represented by a high or low voltage level within each bit period t, and each of said receiving circuits further comprising:

a first flip-flop, having a data input which receives the train of bits and an output which assumes the level of the input train of bits at the up-going transition of a first clock signal, provided by the central control unit, the period of which is twice the bit period, said flip-flop being reset at the down-going transition of said first clock signal, a second flip-flop, having a data input which receives the train of bits and an output which assumes the level of the input train of bits at the down-going transition of the first clock signal, said flip-flop being reset at the up-going transition of said clock signal, and an OR circuit having first and second inputs and which are connected to the outputs of said first and second flip-flops, respectively, and which provides at an output a train of resynchronized bits.

2. A mechanism according to claim 1, in which said data processing units are divided into first and second groups of up to M units, each of the units in the first group transmitting, when required, a request bus bit, when said bus is free over a selected one of the M lines of the bus during a first phase of a second clock signal having the same period as the first clock signal and differing in phase by $\pi/2$ and each of the units in the second group transmitting its request bus bit, when said bus is free, over a selected one of the M lines of the bus during a second phase of said second clock signal, and each receiving circuit in the central control unit further includes a third flip-flop having an input connected to the output of the first flip-flop to store the state of the output signal from the first flip-flop when the bus is free and to provide at its output the request bus bit from the connected data processing unit in the first group, and a fourth flip-flop having an input connected to the output of the second flip-flop to store the state of the output signal from said second flip-flop when the bus is free and to provide at its output the request bus bit from the connected data processing unit in the second group.

3. A mechanism according to claim 1 or 2 in which in each receiving circuit:
the first flip-flop has a first clock input that receives the first clock signal for causing the output from said flip-flop to assume the level of the input train of bits at the up-going transition of said signal and a second clock input that receives the inverse of said first clock signal for resetting said flip-flop at the up-going transition of said inverted clock signal, and the second flip-flop has a first clock input that receives the inverse of the first clock signal for causing the output from said flip-flop to assume the level of the input train at the up-going transition of said inverted signal, and a second clock input that receives said first clock signal for resetting said flip-flop at the up-going transition of said clock signal.

* * * * *